J. M. ELLSWORTH.
CONTAINER FOR FISHING APPARATUS.
APPLICATION FILED AUG. 18, 1909.
952,314.
Patented Mar. 15, 1910.
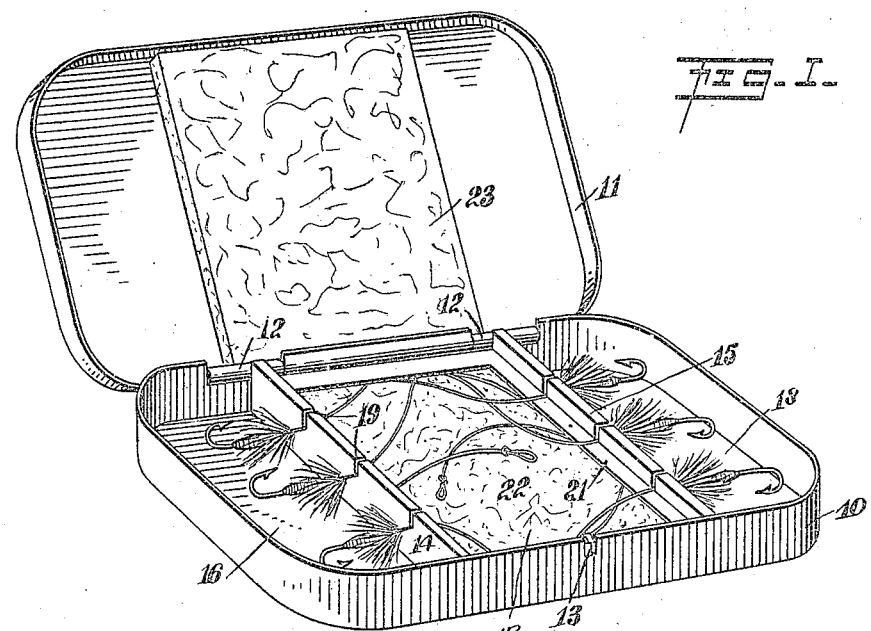
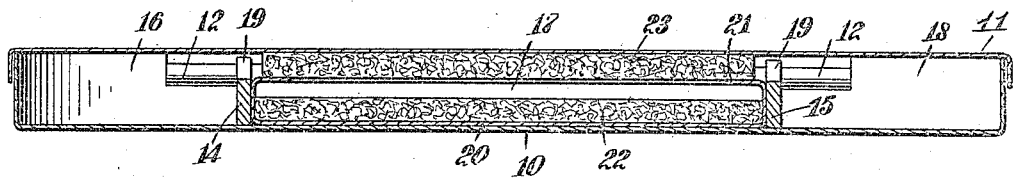
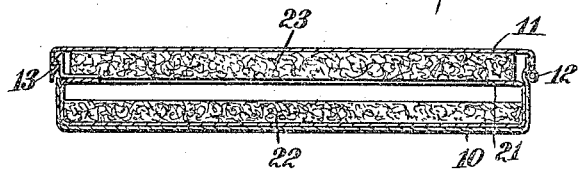
WITNESSES
INVENTOR
John Magee Ellsworth
BY
ATTORNEYS

UNITED STATES PATENT OFFICE.

JOHN MAGEE ELLSWORTH, OF BERNARDSVILLE, NEW JERSEY.

CONTAINER FOR FISHING APPARATUS.

952,314.  Specification of Letters Patent.  Patented Mar. 15, 1910.

Application filed August 18, 1909. Serial No. 513,417.

*To all whom it may concern:*

Be it known that I, JOHN MAGEE ELLSWORTH, a citizen of the United States, and a resident of Bernardsville, in the county of Somerset and State of New Jersey, have invented a new and Improved Container for Fishing Apparatus, of which the following is a full, clear, and exact description.

My invention involves an improved container for carrying flies and their attached leaders used in fishing, and the object of the invention is to so construct the container that the flies will remain dry while the leaders and the connections between the leaders and flies will remain moist. The leaders and the connections to the flies are customarily formed of cat-gut, and it is desirable that they be as flexible as possible. They are kept flexible and pliable by keeping them moist. It is desirable that the flies be kept dry, so that the small fibers or so-called "wings" will remain separated and simulate, as nearly as possible, an insect.

In my improved container I provide one compartment adapted to receive the leaders and connections and a separate compartment adapted to receive the flies, the two compartments being so separated and so constructed that the moisture of one cannot readily pass to the other, but, at the same time, a leader and the flies connected thereto may be readily removed.

Reference is to be had to the accompanying drawings, forming a part of this specification, in which similar characters of reference indicate corresponding parts in all the figures, and in which—

Figure 1 is a perspective view of a container constructed in accordance with my invention; Fig. 2 is a longitudinal section through the container; and Fig. 3 is a transverse section.

My improved container is preferably in the form of a flat box, which may be readily carried in the pocket, and includes a box body 10 and a cover 11. The two are secured together by any suitable form of hinge 12, and when the box is closed it may be retained by any suitable form of catch 13. The box is preferably formed of aluminum, although the construction of the box proper is not essential to my invention.

Within the box I provide two transverse partitions 14 and 15, subdividing the box into three compartments 16, 17 and 18. The two end compartments 16 and 18 are adapted to receive the flies, while the center compartment is adapted to receive the leaders and the cat-gut connections to the hooks. The partitions extend the entire distance across the box and are of such a height that they come closely adjacent the inner surface of the cover when the latter is closed. The partitions may be made of any suitable material, but they preferably are formed of wood rather than metal, so that there will be no sharp upstanding edge to cut the cat-gut. Each partition is provided with a series of notches or apertures 19 in the upper edge thereof and of sufficient size to receive the gut. The notches or apertures may be in the form of saw cuts, so that the minimum amount of free space is left around the gut after the latter is inserted, but the gut may be freely removed.

The center compartment 17 is provided with inwardly-directed flanges intermediate the top and bottom and at approximately the level of the lower portions of the notches or recesses 19. I preferably form these flanges on a separate box 20 inserted within the compartment 17. This box has a bottom in engagement with the bottom of the box body 10, side walls in engagement with the partitions 14 and 15 and in engagement with the front and the back of the box, and provided with an annular inwardly-directed flange 21 at the upper edges of the sides of this inner and smaller box.

Within the inner box and below the flange 21, is a pad 22 of felt or other similar absorbent material, which will retain moisture for a considerable length of time. This moisture pad is of such thickness that it does not engage with the under surface of the flange 21 but leaves a free annular space beneath the flange and above the surface of the felt to receive the leaders, as hereinafter more particularly set forth. The cover of the box carries a pad 23 of such thickness that when the box is closed this pad will come in contact with the upper or outer surface of the flange 21 and will rest between the two partitions 14 and 15.

In using the box, as many flies may be placed in each of the two compartments 16 and 18 as there are notches or apertures in the partition 14 and 15. If desired, two separate flies may be supported at each of the apertures. Each fly is so placed that practically none of the gut comes in the outer compartment, and the gut serves to hold the fly in place and prevent it from moving about. The whole of each leader and approximately the whole of each connecting gut comes in the center compartment and extends across the flange and is coiled upon the pad 22. The coil will expand and most of it will lie beneath the flange 21, so that the leaders will be closely held in engagement with the moisture pad and will, at the same time, be prevented from accidentally coming out of the box when the cover is opened. As the pad 23 contacts with the upper surface of the flange 21, each leader is held in place so that it cannot slip out through into the outer compartment, and, at the same time, the pad prevents moisture from passing over into the outer compartments to any material extent. The inner box 20 with its side walls prevent the partitions 14 and 15 from becoming saturated with moisture and prevents any moisture from passing beneath the partitions.

If a leader be employed to which a plurality of flies are connected by separate strips of cat-gut, then the entire leader and the major portion of said strips will be inclosed in the central compartment and maintained moist. Of course, if no leader be employed, then the strip of cat-gut connected to each separate hook may be coiled in the moist compartment independently of the gut attached to the other hooks.

Having thus described my invention, I claim as new and desire to secure by Letters Patent:

1. A container for fishing apparatus, having a transverse partition therein subdividing the container body into compartments, one of said compartments adapted to receive flies, and the other of said compartments having a moisture pad, and an inwardly-directed extension spaced above the pad and adapted to retain guts in engagement with the latter.

2. A container for fishing apparatus, having two transverse partitions therein each having notches or recesses in its upper side, a second container intermediate said partitions and having an open top and inwardly directed side flanges, a moisture pad within said second-mentioned container and below said flanges, and a second pad adapted to engage with the upper surface of said flanges for retaining leaders beneath said flange.

3. In combination, a main container having a hinged top, a second container within said main container and having an open top, inwardly directed side flanges a pad within the second container and spaced below said flanges, and a pad carried by said cover and adapted to engage with the upper surface of said flanges.

4. A container for fishing apparatus having two transverse partitions therein, each having notches or recesses in its upper side, a moistening pad between said partitions and having its upper surface below the upper edges of said partitions, and flanges extending toward each other from said partitions and spaced above the upper surface of said pad to retain guts in engagement with the pad and to support the portions of the guts extending through said notches or recesses.

5. A container for fishing apparatus having two transverse partitions therein, each having notches or recesses in its upper side, a moistening pad between said partitions and having its upper surface below the upper edges of said partitions, flanges extending toward each other from said partitions and spaced above the upper surface of said pad to retain guts in engagement with the pad and to support the portion of the guts extending through said notches or recesses, and a cover for said container having a moistening pad adapted to fit between said partitions and rest upon said flanges.

In testimony whereof I have signed my name to this specification in the presence of two subscribing witnesses.

JOHN MAGEE ELLSWORTH.

Witnesses:
C. W. FAIRBANK,
PHILIP D. ROLLHAUS.